(12) United States Patent
Böhm

(10) Patent No.: US 11,673,751 B2
(45) Date of Patent: Jun. 13, 2023

(54) VIBRATION FEEDER DEVICE AND METHOD FOR VIBRATION FEEDING OF BULK MATERTAL

(71) Applicant: CiTEX Holding GmbH, Melle (DE)

(72) Inventor: Roland Böhm, Altenberge (DE)

(73) Assignee: CiTEX Holding GmbH, Melle (DE)

( * ) Notice: Subject to any disclaimer, the term of this patent is extended or adjusted under 35 U.S.C. 154(b) by 2 days.

(21) Appl. No.: 17/375,416

(22) Filed: Jul. 14, 2021

(65) Prior Publication Data
US 2022/0017312 A1 Jan. 20, 2022

(30) Foreign Application Priority Data

Jul. 15, 2020 (DE) ...................... 10 2020 118 707.6

(51) Int. Cl.
*B65G 65/44* (2006.01)
*B65G 47/19* (2006.01)
*B65G 47/20* (2006.01)
*B65G 53/66* (2006.01)

(52) U.S. Cl.
CPC .......... *B65G 65/44* (2013.01); *B65G 2201/04* (2013.01)

(58) Field of Classification Search
None
See application file for complete search history.

(56) References Cited

U.S. PATENT DOCUMENTS

| | | | | | |
|---|---|---|---|---|---|
| 3,578,094 | A | * | 5/1971 | Henry | G01G 21/00 198/444 |
| 3,797,633 | A | * | 3/1974 | Stambera | G01G 13/00 222/55 |
| 3,822,866 | A | * | 7/1974 | Daester | B01F 35/881 366/8 |
| 10,119,853 | B2 | * | 11/2018 | Brandt, Jr. | G01G 13/28 |
| 10,577,186 | B2 | * | 3/2020 | Bassani | B65G 27/22 |
| 2006/0032729 | A1 | | 2/2006 | Mosca | |

FOREIGN PATENT DOCUMENTS

| | | |
|---|---|---|
| CA | 2479623 A1 | 3/2006 |
| DE | 3813109 C1 | 8/1989 |

* cited by examiner

*Primary Examiner* — Kavel Singh
(74) *Attorney, Agent, or Firm* — Barnes & Thornburg LLP

(57) ABSTRACT

The present disclosure relates to a method for vibration feeding of bulk material and a vibration feeder device provided for such purposes, comprising a material feed, a charging hopper including a hopper discharge, a feeder tray, a height adjustment means for adjusting a level height between the hopper discharge and the feeder tray, and a vibration driver for driving the feeder tray at an oscillation amplitude and an oscillation frequency, where a target material throughput and material specific parameters of the bulk material are input, initial parameters for the level height, oscillation amplitude and oscillation frequency are determined from these inputs, and subsequently the level height is adjusted by controlling the height adjustment means.

15 Claims, 3 Drawing Sheets

VIBRATION FEEDER DEVICE AND METHOD FOR VIBRATION FEEDING OF BULK MATERTAL

PRIORITY CLAIM

This application claims priority to German Patent Application No. DE 10 2020 118 707.6, filed Jul. 15, 2020, which is expressly incorporated by reference herein.

BACKGROUND

The present disclosure relates to a vibration feeder device and a method for vibration feeding of bulk material.

SUMMARY

According to the present disclosure, a method for vibration feeding of bulk material and a vibration feeder may include automated adjustment and controlling of the vibration feeder device so as to attain a desired target material throughput.

In illustrative embodiments, the user will input a target material throughput, e.g. in kg/h, and material specific parameters of the bulk material such as, in particular, the type of material and the grain size and/or type of grains, e.g. powder, granulate, flakes etc., and, if applicable, further relevant parameters such as temperature or humidity level. From these, initial parameters of the operational parameters to be applied are then determined and set and the feeder device is put in operation.

During operation the total mass of a relevant arrangement including the bulk material contained therein is measured and, from this, the material throughput is determined as temporal change or decrease respectively is determined continuously, whereupon the current material throughput is evaluated and the operational parameters are adjusted or changed respectively.

Hereby, it is recognized, in particular, that it is primarily the layer height or filling level respectively, i.e. the vertical distance between the bottom hopper discharge and the feeding tray, that is to be adjusted, and subsequently a fine adjustment of the material throughput or transport stream respectively will be adjusted by changing the oscillation amplitude. To that end, it is possible to compare the determined material throughput to the target material throughput in the evaluation step, thereby determining a difference so that thereafter the amount of the difference is compared to a difference threshold value so that the oscillation amplitude is adjusted depending on this comparison or as a fine adjustment.

Thus, in the event that the amount of the difference is below the difference threshold value, an adjustment can be made solely by changing or fine-tuning respectively the oscillation amplitude, while, in the event that the amount of the difference exceeds the difference threshold value, the layer height is changed, possibly even with a corresponding adjustment of the oscillation amplitude, so that, advantageously, for the different layer height another characteristic curve of the stored set of characteristic curves can be utilized.

Thus, an effective adjustment can be attained without unnecessary continuous "trial and error" procedures with regard to various parameters, which are later hard or even impossible to reproduce, and, moreover, the target material throughput can be attained quickly.

In illustrative embodiments, the layer height to be set constitutes the primary adjustment value and the fine adjustment of the material throughput then happens by changing the oscillation amplitude.

In illustrative embodiments, a change in the oscillation frequency is less advantageous. Advantageous, the oscillation frequency will be set to a fixed value which may depend, in particular, on the vibrating characteristics of the feeder system consisting of the feeding tray with bulk material and elastic suspension.

In illustrative embodiments, an oscillation frequency will be selected which is close to a natural frequency of the system capable of vibration, however, deviating from this natural frequency or resonant frequency respectively, in particular, a fixed oscillation frequency within a range of up to 20% above or below the natural frequency or resonant frequency respectively.

In illustrative embodiments, an effective, energy efficient and even material saving operation of the feeding tray with its elastic suspension is achieved, without risking damage by too large vibrations.

In illustrative embodiments, the vibration feeder device may include an elastic suspension of the feeder tray on the basis of a vibration driver with leaf springs allowing vibration in a direction combined from the direction of transport and the vertical direction.

In illustrative embodiments, characteristic curves may be stored for various materials, in particular depending on the material and grain size of the bulk material. Thus, the user can enter the target material throughput and the material characteristics of the bulk material via a user interface prior to commencement of process operation so that the controller device will apply the stored characteristic curves in accordance with the input values.

The characteristic curves may be derive, in particular, from calibration measurements or test measurements, in particular, using individual measurements points between which interpolations may be made. Thus, in particular, a characteristic curves file may exist for the respective material containing several characteristic curves for various level heights and oscillation amplitudes.

This allows for a highly precise, highly material specific adjustment making it possible to directly make an advantageous selection of suitable initial parameters. The storage with the characteristic or characteristic curves data respectively may be continuously updated and extended so as to allow for a quick and exact adaptation, to include even to bulk material not previously transported.

In illustrative embodiments, a characteristic curve is selected in which the operating point for the target material throughput lies in a middle range which may be selected e.g. as a middle range in percentages of the characteristic curve or as minimum distance of the characteristic curve from the boundaries or ends of the characteristic curve.

This allows for variability in terms of larger and smaller material throughputs, if changes appear in the subsequent adjustment controlling due to actual process conditions, without leaving the characteristic curve.

The selection of a middle operating point may be made e.g. in that changes of the material throughput by at least 20 or 50% towards lower and higher values are possible without changing the level height selected as the primary set value.

In illustrative embodiments, the present disclosures provides for level height that can be set in a reproducible manner and, for that purpose, the further process parameters can be stored for achieving desired target material throughputs.

It is possible to measure a transport consistency, i.e. the short-term deviations of the material throughput. Thus, according to the present disclosure, it was determined that e.g. a set minimal level height of the transport stream in the feeding tray allowed for a highly precise adjustment of the transport stream per oscillation amplitude change and therewith a precise adjustment of the material throughput, while, however, the mass maximum achievable throughput at such a setting is very small.

Thus, for granulates it could be determined that upon setting a selected minimum level height e.g. 0 to 10% of the maximum transport range can achieved, while in turn a very high consistency of transport was attained. However, when setting a maximum level height, e.g. determined by the tray height thereby aiming at completely filling the feeding tray, depending on the material e.g. 20 to 30% can be achieved by selecting smaller adjustment values of the oscillation amplitude. Due to the high layer which will break internally in an undefined manner, in particular also with compressed powders, however, the attained transport consistency of the transport stream on the tear-off edge of the material discharge of the feeding tray is not very good, in particular, in the case of small throughputs.

Thus, preferably, a middle position is set as initial parameters, e.g. in a range between 10 and 60% of a maximum transport stream, thereby achieving a good transport consistency and high material throughput at the same time.

According to an advantageous embodiment, the characteristic curves are stored with discrete or, respectively, predetermined layer heights of the height adjustment device, thereby increasing reproducibility. The values may also be set e.g. by means of mechanical catches, which is of advantage considering the significant amounts of mass to be adjusted and increases mechanical stability.

In illustrative embodiments, the height adjustments are carried out fully automatically by e.g. an electric motor height adjustment device. Thus, the controller device will receive, on the one hand, the values entered by the user and, on the other, during operation the total mass as a function of time for determining the material throughput, and adjust the parameters of the vibration driver and the height adjustment device using suitable control signals. Thus, according to the present disclosure leads to a highly user friendly experience, wherein e.g. the user may enter merely e.g. the type of material, the grain size and the target material throughput as input data, whereupon the controller device determines the relevant characteristic curve and there from the initial parameters and subsequently takes over control.

In illustrative embodiments, the selection of initial parameters of the vibration feeder, i.e. in particular initial oscillation frequency, initial level height and initial oscillation amplitude, may be carried out under consideration of relative transport rate deviations of the mass throughput. Thus, relative transport rate deviations of the mass throughput depending on, in particular, the material, i.e. material specific, are stored for the corrective value, i.e., in particular, an analog voltage applied to the vibration driver. Thus, advantageously, a small relative transport rate deviation may be selected to attain a constant material throughput.

In illustrative embodiments, the characteristic curves may additionally include the relative transport rate deviations of the mass throughput depending on the corrective value. Thus, the characteristic curves may be stored multi-dimensionally, e.g. three-dimensionally.

Relevant bulk materials are generally all capable of being fluidized, granulated materials, e.g. powder, grains, granulate, flakes, shredded particles, chips or re-granulate. The types of material may be e.g. raw materials for a subsequent treatment process manufacturing process respectively, e.g. plastics such as polymers, or rubber and other materials for a subsequent extrusion process; further, stone or sand and similar materials, but also e.g. food such as flour and other raw materials may be transported.

In illustrative embodiments, the controller device may store the current measurements and settings, i.e. the ratio of material throughput as a function of the set level height and the oscillation amplitude at the oscillation frequency f, in the memory or, respectively, dynamically correct these data so that even changes of the device over longer periods of operation, e.g. by wear, or changes of vibration characteristics that may lead to a change of litter weight, can be taken into consideration. Thus, the process is constantly updated and improved, in principle, without the user having to take any action.

A method or a device, where an oscillation frequency is set which is unequal to a resonance frequency of the resonating system consisting of the elastic suspension and the feeder tray loaded with the bulk material, preferably in a range between 10 and 20% below or above the resonance frequency of the resonating system consisting of the elastic suspension and the feeder tray loaded with the bulk material;

a method or a device, where for each characteristic curve, always for one type of material and one particle size, the material throughput is determined depending on the oscillation amplitude and the level height;

a method or a device, where the characteristic curves indicate a relative transport rate deviation depending on a/the corrective variable;

a method or a device, where a characteristic curve with initial parameters for a small or smallest initial oscillation amplitude is selected, for high energy efficiency;

a method or a device, where the level height and the oscillation amplitude at the oscillation frequency are stored as operational parameters;

a method or a device, where a mass discharge that happened during the filling phase by the material discharge is either estimated form the previously determined material throughput or neglected.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
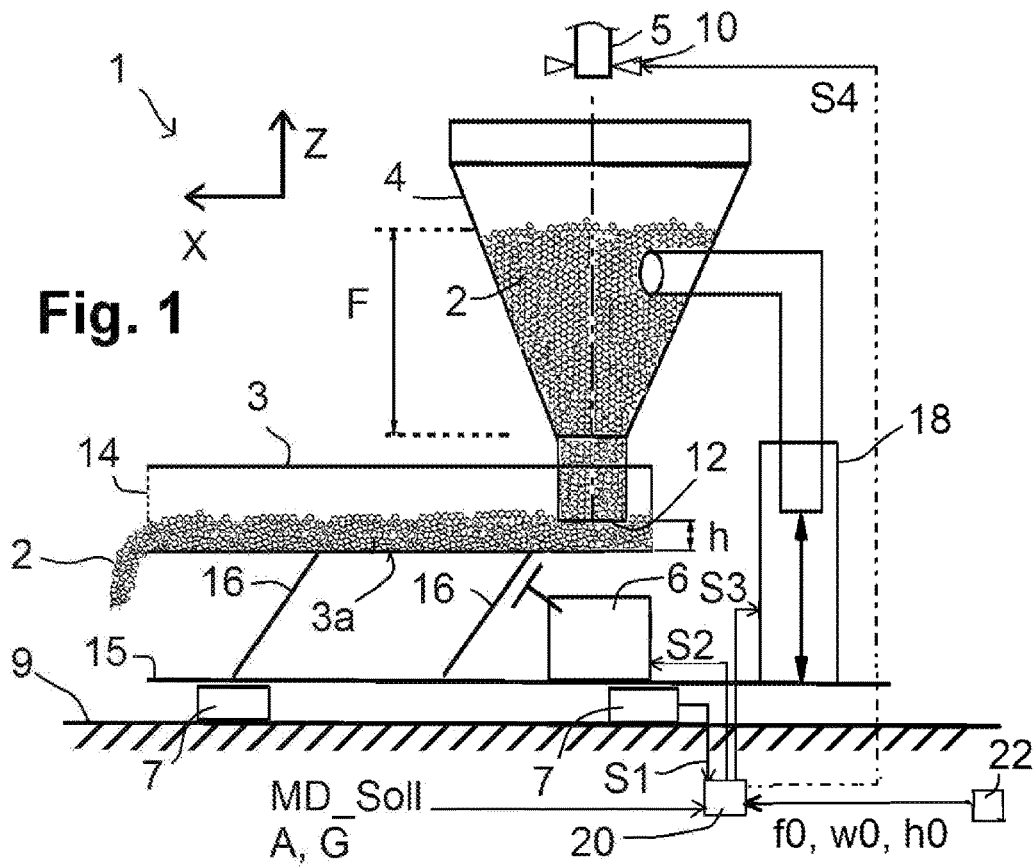
FIG. 1 shows a vibration feeder device according to a first embodiment including a height adjustment means of the charging hopper.

FIG. 1 shows a vibration feeder device 1 for continuously transporting bulk material 2 with adjustable material throughput MD. As bulk material 2 various granulated goods may be transported, e.g. powder with grain sizes in the millimeter range or even less, up to e.g. granulates, pellets and flakes with grain sizes in the centimeter range. The vibration feeder device 1 comprises a feeder tray 3, a charging hopper 4, a material feed 5, a vibration driver 6, as well as a scales 7, where the scales 7 and thereby the entire vibration feeder device 1 rests on an underground 9. The bulk material 2 is filled, via the material feed 5, which comprises e.g. an electrically controlled discharge valve 10, in filing phases into the charging hopper 4, thereby increasing in each case the hopper filling height F in the charging hopper 4. Due to the gravity in the charging hopper 4 the bulk material 2 will subsequently fall downwards and through the bottom hopper discharge 12 into the feeder tray 3. Hereby, the bottom hopper discharge 12 is arranged at a level height h above the feeder tray 3, e.g. the bottom 3a of the feeder tray 3, so that bulk material 2 will initially accumulate in the feeder tray 3 at a level height h.

In one example, the feeder tray 3 is open at the top and may exhibit a varying cross-section, e.g. rectangular, V shaped or semi-circular, generally with a constant cross-section throughout the length of the feeder tray 3 up to its end, i.e. the material discharge 14. Hereby, the feeder tray 3 may be arranged horizontally, i.e. without any slope, or perhaps with a slight slope towards the material discharge 14. The feeder tray 3 is arranged via leaf springs 16 on a vibration driver base 15, the vibratable system made of feeder tray 3 and leaf springs 16 being vibrated by the vibration driver 6, the vibrations usually running perpendicular to the feeder tray, i.e. with a vertical z component and a longitudinal component in the transport direction x towards the material discharge 14. Further, in the embodiment of FIG. 1 a height adjustment means 18 is provided to adjust the height of the charging hopper 4 in relation to the feeder tray 3; thus, the level height h is adjusted via the height adjustment device 18. Thus, the height adjustment device 18 including the charging hopper 4 supported by it and the bulk material 2 contained in the charging hopper 4, the vibration driver 6, and the feeder tray 3 including the bulk material 2 contained therein including the leaf springs 16 are supported on the vibration driver base 15 so that this entire arrangement can be continuously weighed via the scales 7.

The vibration driver 6 drives the feeder tray 3 at the set parameters, i.e. the oscillation amplitude (thrown distance) w, which may e.g. be up to 1500 μm or more, and the oscillation frequency f. The bulk material 2 accumulated below the hopper discharge 12 is transported accordingly in the feeder tray 3 towards the material discharge 14 and subsequently discharged so that it will then no longer contribute to the total mass weighed. Measuring the material throughput MD depends on the level height h, the amplitude w and the oscillation frequency f, as well as on the material specific parameters of the bulk material 2 ab.

Thus, the oscillation frequency f may be set to a fixed value f0, in particular an oscillation frequency f0 slightly below or above a resonance frequency fR of the vibratable systems made of feeder tray 3 and leaf springs 16, so that an effective transport with high utilization of the energy fed to the vibration driver 6 and without damaging the elastic system is achieved.

Figure 3:
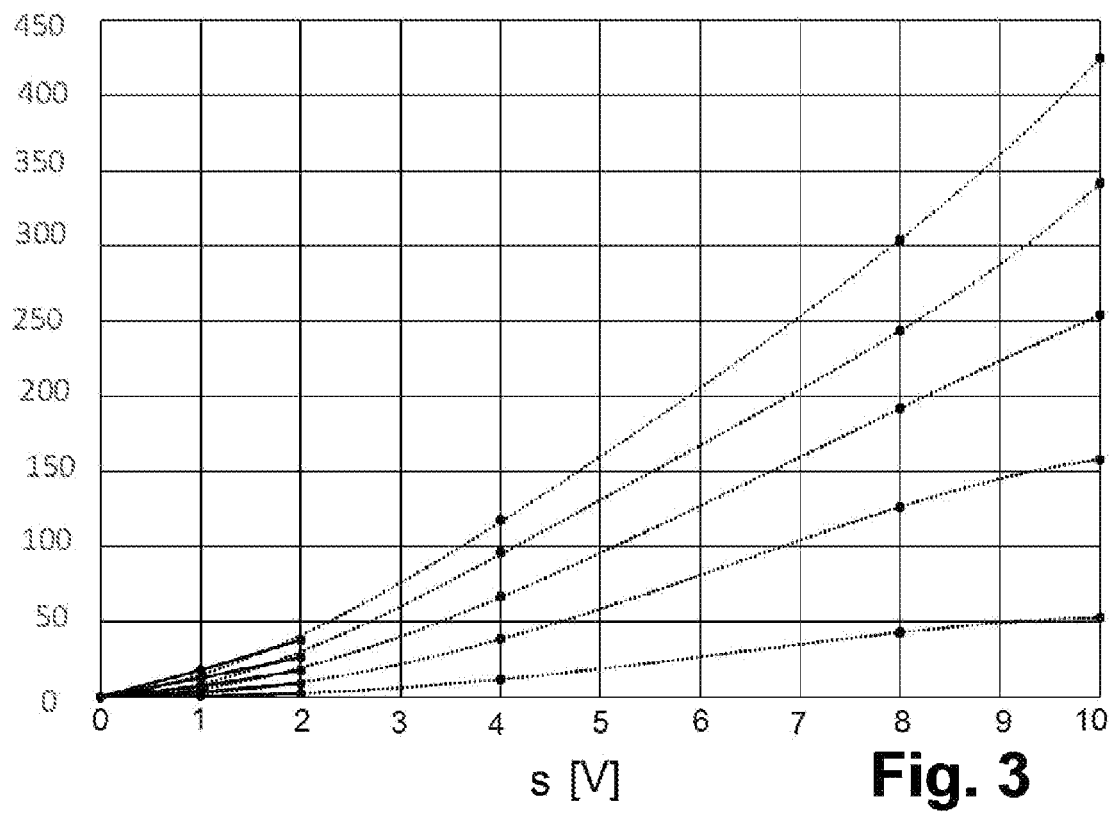
FIG. 3 shows a diagram of the dependency of the mass throughput over a corrective variable and level height under the hopper.
Figure 4:
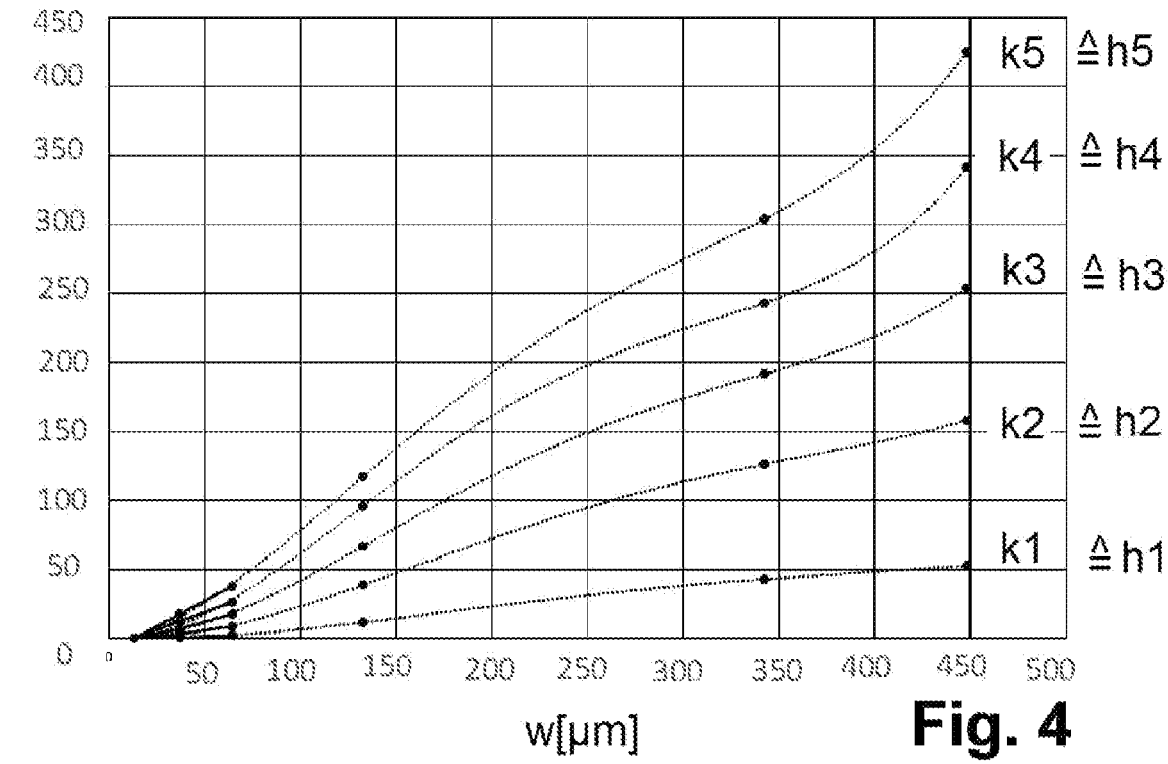
FIG. 4 shows a diagram of the mass throughput over an oscillation amplitude and level height under the hopper.

Further, initial values h0 and w0 are selected which are then adapted or controlled respectively in the manner described below. Advantageously, the initial setting or Preset setting respectively of the operating parameters f0, h0, w0 for the desired mass throughput MD are stored in the controller means 20 or, respectively, in a memory 22 coupled with the controller means 20 in material specific characteristic curves Ki, i=1, 2, 3, . . . , shown, in particular, in FIGS. 3 and 4. The characteristic curves Ki are defined, in particular, by individual measuring points between which interpolation can be carried out. In FIG. 4, in the characteristic curves Ki the mass throughput MD as a function of the oscillation amplitude w and the level height h is stored; FIG. 3 illustrates a dependency of the mass throughput MD over a corrective variable s, which may be e.g. between s=0 and 10 V; alternatively, the corrective variable s may also be defined by the current at values of e.g. up to 20 mA.

Thus, in FIG. 4 it is provided e.g. as follows: the characteristic curve K1 for the level height h1=7.5 mm; the characteristic curve K2 for die level height h2=15 mm; the characteristic curve K3 for die level height h3=22.5 mm; the characteristic curve K4 for die level height h4=30 mm; and the characteristic curve K5 for die level height h5=37.5 mm.

Thus, these values are stored for the various types of material A of bulk materials 2, further preferably additionally also as a function of the particle size (grain size) G, further preferably also as a function of the temperature T and optionally of the degree of humidity, i.e. one characteristic curve field for each type of material A and particle size G, according to FIG. 4.

To that end, values according to FIGS. 3 and 4 are determined for commonly used bulk materials 2 by means of calibration measurements and stored in the memory 22.

Figure 2:
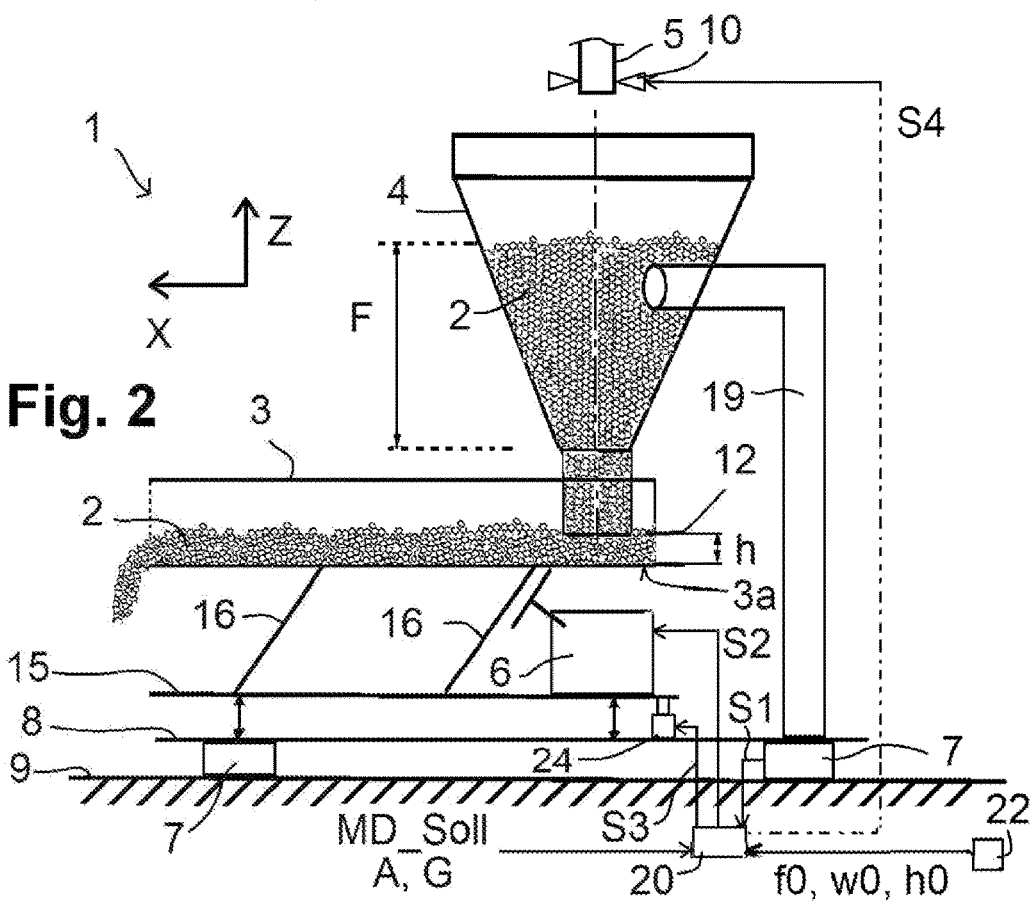
FIG. 2 shows a vibration feeder device according to a second embodiment including a height adjustment means of the feeder tray with vibration driver.

In the embodiment of FIG. 2, the charging hopper 4 including the non-adjustable hopper holder 19 are arranged firmly on a base 8. The vibration driver base 15 including the leaf springs 16, feeder tray 3 and vibration driver 6 can be height adjusted via a height adjustment device 24 so that in this embodiment the feeder tray 3 is adjusted in relation to the bottom hopper discharge 12 in order to adjust the level height h. Here, too, the entire arrangement including the charging hopper 4 is weighed via the base 8 using the scales 7.

Thus, in both embodiments, the controller means 20 receives measuring signals S1 of the scales 7, which may be designed e.g. as a force measuring unit or a pressure measuring unit or lead cell respectively, and puts out control signals S2 to the vibration driver 6, S3, the respective height adjustment device 18 (of FIG. 1) or 24 (of FIG. 2) and S4 the output valve 10.

Further, the initial parameters of the vibration feeder, i.e. in particular initial oscillation frequency f0, initial level height h0 and initial oscillation amplitude W0, may be selected under consideration of relative transport rate deviations RF of the mass throughput MD. Thus, there are regions, in particular at the start and at the end of the corrective variable s, that exhibit a higher degree of inaccuracy in the transport characteristics as middle regions.

Thus, a region with low relative transport rate deviations RF may be selected to achieve a high consistency of the material throughput when regulating the corrective variable s.

Thus, e.g., at the values
mass throughput MD 80 kg/h
level height h 7 mm (small)
corrective variable s at 95%
there is a relative transport rate deviation RF of 5%,
while at the values
mass throughput MD 80 kg/h
level height h 50 mm (max)
corrective variable s at 3%
there is a relative transport rate deviation RF of 5%,
and at the values
mass throughput MD 80 kg/h
level height h 20 mm (small)
corrective variable s at 30%
there is a relative transport rate deviation RF of 0.8%.

Thus, a minimum of relative transport rate deviations RF will not always be at a middle values of the level height or corrective variable so that knowing RF allows an adjustment with high transport consistency. Thus, in this example, a relatively small level height h may be selected. Thus, preferably, the material specific transport rate deviation RF data are part of the transport characteristic curve K which may be stored multi-dimensionally accordingly.

Figure 5:
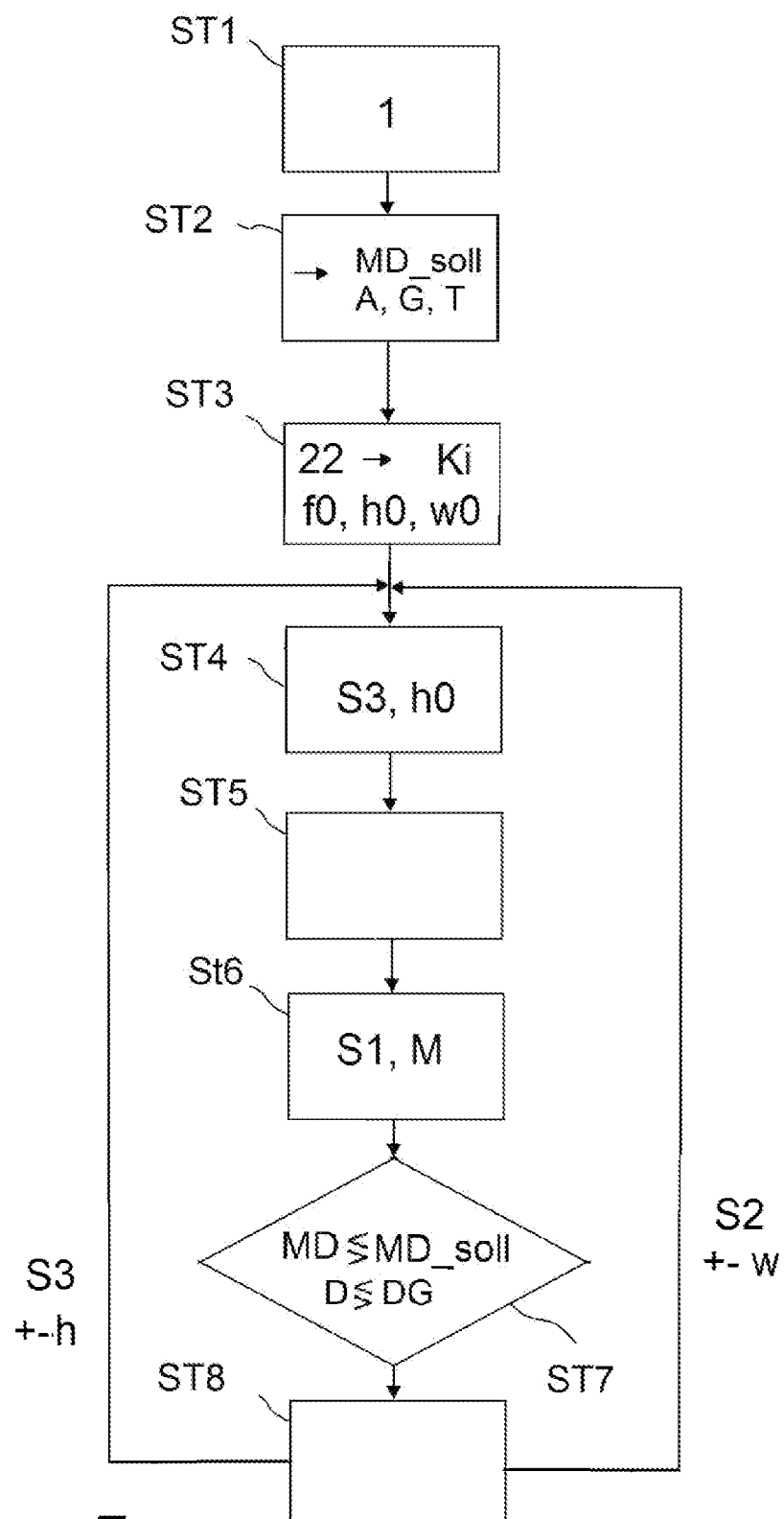
FIG. 5 shows a flow chart of a method according to the present disclosure.

For all embodiments of the method for vibration feeding of the bulk material 2 according to the present disclosure, the following steps are provided according to FIG. 5:

Firstly, in step ST1, the vibration feeder device 1 with the above-described features is provided.

In step ST2, the selection or input respectively of the target material throughput MD_soll and the relevant material specific values for the bulk material 2 is carried out, i.e. type of material A and particle size G, possibly also further parameters such as temperature, degree of humidity of the bulk material 2.

To that end, in step ST3, the controller means 20 determines the relevant material specific characteristic curve Ki, i=1, 2, 3, . . . and retrieves this from the memory 22, whereupon it determines the initial parameters f0, h0, w0 from the characteristic curve Ki and the target material throughput MD_soll, whereby, preferably, the oscillation frequency f0 is fixed and not even subsequently changed in operation or in the running process respectively. Preferably, a characteristic curve criterion KK is utilized, pursuant to which a characteristic curve Ki is selected, which in operation allows sufficient variance or changes respectively in both directions, i.e. towards a larger material throughput MD and a smaller material throughput MD.

In step ST4, the initial level height (filling height) h0 is adjusted by controlling the height adjustment device 18 or 24.

The, in step ST5, transport happens, i.e. operation of the vibration feeder device 1, for which purpose the controller means 20 controls the output valve 10 in filling phases thereby filling the charging hopper 4 in phases while increasing the total mass M, and, further, the vibration driver 6 is controlled, i.e. initially using the initial parameters w0, h0; further, in step ST6, the controller means 20 receives the measuring signal S1 of the scales 7 auf thereby determining the current mass throughput MD as the ratio mass/time.

In vibration feeding the bulk material 2 is transported in the feeder tray 3 in transport throws of the vibration driver 6 and reaches the material discharge 14, through which it is discharged and no longer weighed; subsequently it will be fed to e.g. an extruder or another processing means. As illustrated above, in FIG. 1, the scales 7 weighs the arrangement on the vibration driver base 15 including the vibration driver base 15 and, in FIG. 2, the arrangement on the base 8, so that, corresponding to the material discharge, the determined total mass M decreases over time t, which can be measured directly as material throughput MD in e.g. kg/h. Upon reaching a lower hopper filling height F in the charging hopper 4, which may be determined, in particular, as reaching a lower mass value, the output valve 10 is opened again and the next filling amount or filling charge of bulk material 2 is introduced into the charging hopper 4. These filling phases are relatively short and are advantageously disregarded or estimated when determining the material throughput MD, i.e. for the duration of the transport phase e.g. the prior determined average material throughput MD is assumed. This leads to a continuous transport via the vibration driver 6.

According to a further embodiment it is possible to weigh solely the material removal in the charging hopper 4, i.e. independent of the filling of the feeder tray 3, thus, the material removal in the charging hopper 4 corresponds to the material throughput MD, in particular, when temporally averaged accordingly.

In step ST7 the determined material throughput MD is evaluated by comparing it to the target material throughput MD_soll. The controller means 20 evaluates the measured den material throughput MD, so as to subsequently, in step ST8, make a change in operating parameters, i.e. in particular the amplitude W and/or the level height h. Thus, the level height h and/or the amplitude W is increased if the material throughput MD is smaller than the target material throughput MD_soll, and, correspondingly, decreased when it is too high.

Thereupon, the controlling is continued by resetting the process prior to the step ST4, i.e. the setting of the determined altered operating parameters.

Upon evaluation in step ST7, a decision is made, in particular, as to whether the level height h and/or the oscillation amplitude W should be changed. This may happen, in particular, as rough adjustment by changing the level height h and fine adjustment by changing the oscillation amplitude W. For that purpose, e.g. a differential value D is created as the amount of the difference of the material throughput MD and the target material throughput MD_soll, and the differential value D is compared to a difference threshold value DG, and, upon exceeding the difference threshold value DG, the level height h is altered, i.e. the height adjustment device 18, 24 is controlled by a control signal S3, and, upon falling below the difference threshold value DG, the oscillation amplitude W is changed, i.e. by means of a control signal S2, and the vibration driver 6 is controlled.

Hereby, in particular, a proportional controlling may be carried out, i.e. a change of level height h or oscillation amplitude W by a value corresponding the difference of the material throughput.

Thus, advantageously, according to the characteristic curves of FIG. 3 and FIG. 4, upon a change in level height h another characteristic curve Ki is selected, based upon which subsequently the oscillation amplitude W is adjusted. Thus, a change in level height h there will generally be followed by a corresponding adaptation of the oscillation amplitude W because, advantageously, pre-determined height setting or discrete height values of the level height h are set, based upon which subsequently the fine adjustment or fine control happens by adjusting the oscillation amplitude W, i.e. along the characteristic curve Ki.

Hereby, the controller means 20 will allow for the characteristic curves to have a sufficient variance downwards and upwards, i.e. a level height h will be set which allows for changes of the material throughput MD towards smaller and larger values solely by controlling the vibration driver 6.

Thus, preferably, changes in the process, e.g. caused by changes in temperature of the bulk material 2, as well as further changed parameters such as humidity, as well as possibly even material changes in the fed-in bulk material 2, may also be considered dynamically.

Preferably, changes in the target material throughput MD_soll are considered during operation, e.g. as ramp or linear transitions in the event of changes in throughput.

Further, the controller means 20 may store the current measurements and settings, i.e. the ratio of material throughput MD as a function of the set height parameters of the level height h and the oscillation amplitude W at the oscillation frequency f, in the memory 22 or, respectively, dynamically correct these data so that, thereby, changes of the device over longer operating periods are also taken into consideration.

The present disclosure relates to a vibration feeder device and a method for vibration feeding of bulk material.

Vibration feeder technology serves to convey granulated goods or bulk materials respectively. Hereby, bulk material is fed in from a filling hopper, i.e. a reservoir feeding tray that can be filled, to a feeding tray, and the feeding tray is set into oscillations or vibration respectively by means of a vibration driver, which in turn causes the bulk material to be transported along the feeding tray towards its end which represents the material exit. The vibration driver sets the feeding tray in vibrations with the oscillation frequency and oscillation amplitude or throw distance respectively set to defined values, by virtue of which, consequently, the bulk material is intermittently transported along the feeding tray. The filling hopper usually comprises a hopper discharge at its bottom end from which the granulated bulk material falls onto the feeding tray and, at first, essentially stays within the filing area between the hopper discharge and the feeding tray without being distributed towards the side very much. As a result of the vibrations of the vibration feeder it will subsequently be thrown in the direction of transport in micro steps, whereby the reservoir material contained in the filling hopper automatically shifts down from the hopper discharge onto the feeding tray thereby causing the filling hopper to empty.

Vibration feeder technology aims, in particular, at attaining a defined material throughput, i.e. masse per time, so as to feed the bulk material continuously to e.g. a processing chain.

The material throughput is measured, in particular, using the loss in weight principle. Hereby, the cross section of the feeding tray, an expected layer height and the vibration amplitude (distance of throw) and oscillation frequency may be taken into consideration. Due to the material specific transport characteristics of the respective bulk material, however, there will usually be a material throughput which is hard to be deduced from theoretical calculations. Thus, material specific transport characteristics are relevant, such as shape and quality of the bulk material, stability, end even e.g. elasticity properties as a function of the ensuing layer height, e.g. the damping behavior during transport, and also the adhesion, in particular bridging adhesion, characteristic of compressibility or incompressibility, and, furthermore, the effects of varying temperatures on these material specific characteristics, as well as the degradation of the layer thickness height as a function of the tray length. Also, the surface characteristics of the feeding tray, its shape, as well as the design of the material exit as a tear-off edge of the feeding tray, are relevant hereby. Furthermore, for a theoretical calculation of the material throughput the boundary conditions of the vibrations, in particular, the rigidity of the tray, the vibration decoupling in relation to the underground, and the vibration model resulting there from, are relevant.

Thus, usually, prior to commencement of the vibration feeding action a rough adjustment of the vibration feeder device will be carried out in that a height position of the feeder hopper with its bottom hopper discharge above the feeding tray is set and the vibration driver is operated at starting parameters. Subsequently, the ensuing material throughput can be measured by measuring the total mass from the filling hopper, feeding tray and further parts including the bulk material contained, since the filling hopper is usually filled with batch charges in filling phases and, subsequently, the total mass will decrease accordingly upon feeding. The total mass can be measured using a scales, e.g. as force or pressure.

Thus, usually, the parameters of a vibration driver of the vibration feeder device, i.e. oscillation frequency and oscillation amplitude, are altered accordingly so as to attain the target material throughput.

The vibration driver can be adjusted, in the parameters oscillation frequency and oscillation amplitude, also by means of a single parameter correcting variable, e.g. a voltage applied.

Hereby, depending on the material, differing material throughputs or transport streams respectively and different behavior exist even at initially identical transport conditions. Thus, set height positions of the feeder hopper and operating parameters of the vibration driver, that have proved to be suitable for a granulate, may lead to insufficient results e.g. with powders.

Thus, in practice, the height of the feeder hopper is set, and a corresponding limited material stream is accepted, or even the height position of the feeder hopper is manually continuously adjusted subsequently, whereby such adjustments usually do not allow reproducible results for these parameters.

Hereby, differences in layer height or level height respectively, i.e. the vertical distance of the bottom hopper discharge in relation to the feeding tray, lead to differences in material throughput. A larger layer height leads to larger layer thicknesses of the bulk material in the feeding tray and thereby to an increased material throughput.

A comparative method and a comparative device for controlling the transport rate of vibration feeder devices may employ a comparative drive that is controlled to adjust the transport rate in a vibration feeder device with weight monitoring with a material container, a vibration feeder means with a drive for vibrating the material container, a weighing device for determining the weight of the material transported and a device for estimating the transport rate, whereby the current transport rate is estimated and a correcting variable is fed to the vibration feeder device to adjust the transport rate, whereby several steps are provided.

A comparative controller device for a vibration feeder which can be excited by a magnetic device including a power element upstream from the magnetic device. Hereby, a sensor generates a signal corresponding to the vibration of the vibration feeder which is fed to the controller circuit as actual value, whereby a nominal value for the oscillation predetermined by a specification device is compared to the actual value.

A comparative system for controlling the feed-in rate of a vibrations feed-in comprising a device for measuring the amount output by the feed-in device, a device for changing an angle of inclination of the feed-in device, and a controller, where the controller is coupled to a measuring device and a device for changing the gradient so as to make adjustments depending on changes in weight or volume of the material output.

Therefore, the present disclosure creates a method for vibration feeding of bulk material and a vibration feeder device enabling a secure and reproducible adjustment of a material throughput.

The method according to the present disclosure may be executed, in particular, using a vibration feeder device according to the present disclosure. The vibration feeder device according to the present disclosure is provided, in particular, for carrying out a process according to the present disclosure.

Thus, according to the present disclosure, an automated adjustment and controlling of the vibration feeder device so as to attain a desired target material throughput.

To that end, the user will input a target material throughput, e.g. in kg/h, and material specific parameters of the bulk material such as, in particular, the type of material and the grain size and/or type of grains, e.g. powder, granulate, flakes etc., and, if applicable, further relevant parameters such as temperature or humidity level. From these, preferably, initial parameters of the operational parameters to be applied are then determined and set and the feeder device is put in operation.

During operation the total mass of a relevant arrangement including the bulk material contained therein is measured and, from this, the material throughput is determined as temporal change or decrease respectively is determined continuously, whereupon the current material throughput is evaluated and the operational parameters are adjusted or changed respectively.

Hereby, it is recognized, in particular, that it is primarily the layer height or filling level respectively, i.e. the vertical distance between the bottom hopper discharge and the feeding tray, that is to be adjusted, and subsequently a fine adjustment of the material throughput or transport stream respectively will be adjusted by changing the oscillation amplitude. To that end, it is possible to compare the determined material throughput to the target material throughput in the evaluation step, thereby determining a difference so that thereafter the amount of the difference is compared to a difference threshold value so that the oscillation amplitude is adjusted depending on this comparison or as a fine adjustment.

Thus, in the event that the amount of the difference is below the difference threshold value, an adjustment can be made solely by changing or fine-tuning respectively the oscillation amplitude, while, in the event that the amount of the difference exceeds the difference threshold value, the layer height is changed, possibly even with a corresponding adjustment of the oscillation amplitude, so that, advantageously, for the different layer height another characteristic curve of the stored set of characteristic curves can be utilized.

Thus, an effective adjustment can be attained without unnecessary continuous "trial and error" procedures with regard to various parameters, which are later hard or even impossible to reproduce, and, moreover, the target material throughput can be attained quickly.

Thus, according to the present disclosure, it is recognized that the layer height to be set constitutes the primary adjustment value and the fine adjustment of the material throughput then happens by changing the oscillation amplitude.

Hereby, according to the present disclosure, it is recognized, in particular, that a change in the oscillation frequency is less advantageous. Advantageous, the oscillation frequency will be set to a fixed value which may depend, in particular, on the vibrating characteristics of the feeder system consisting of the feeding tray with bulk material and elastic suspension.

Advantageously, an oscillation frequency will be selected which is close to a natural frequency of the system capable of vibration, however, deviating from this natural frequency or resonant frequency respectively, in particular, a fixed oscillation frequency within a range of up to 20% above or below the natural frequency or resonant frequency respectively.

Hereby, an effective, energy efficient and even material saving operation of the feeding tray with its elastic suspension is achieved, without risking damage by too large vibrations.

The vibration feeder device may include an elastic suspension of the feeder tray on the basis of a vibration driver with leaf springs allowing vibration in a direction combined from the direction of transport and the vertical direction.

According to the present disclosure, advantageously, characteristic curves are stored for various materials, in particular depending on the material and grain size of the bulk material. Thus, the user can enter the target material throughput and the material characteristics of the bulk material via a user interface prior to commencement of process operation so that the controller device will apply the stored characteristic curves in accordance with the input values.

The characteristic curves may be derive, in particular, from calibration measurements or test measurements, in particular, using individual measurements points between which interpolations may be made. Thus, in particular, a characteristic curves file may exist for the respective material containing several characteristic curves for various level heights and oscillation amplitudes.

This allows for a highly precise, highly material specific adjustment making it possible to directly make an advantageous selection of suitable initial parameters. The storage with the characteristic or characteristic curves data respectively may be continuously updated and extended so as to allow for a quick and exact adaptation, to include even to bulk material not previously transported.

A characteristic curve is selected in which the operating point for the target material throughput lies in a middle range which may be selected e.g. as a middle range in percentages of the characteristic curve or as minimum distance of the characteristic curve from the boundaries or ends of the characteristic curve.

This allows for variability in terms of larger and smaller material throughputs, if changes appear in the subsequent adjustment controlling due to actual process conditions, without leaving the characteristic curve.

The selection of a middle operating point may be made e.g. in that changes of the material throughput by at least 20 or 50% towards lower and higher values are possible without changing the level height selected as the primary set value.

Thus, the present disclosure leads to a few advantages. Thus, level height can be set in a reproducible manner and, for that purpose, the further process parameters can be stored for achieving desired target material throughputs.

Furthermore, according to the present disclosure, it is possible to measure a transport consistency, i.e. the short-term deviations of the material throughput. Thus, according to the present disclosure, it was determined that e.g. a set minimal level height of the transport stream in the feeding tray allowed for a highly precise adjustment of the transport stream per oscillation amplitude change and therewith a precise adjustment of the material throughput, while, however, the mass maximum achievable throughput at such a setting is very small.

Thus, for granulates it could be determined that upon setting a selected minimum level height e.g. 0 to 10% of the maximum transport range can achieved, while in turn a very high consistency of transport was attained. However, when setting a maximum level height, e.g. determined by the tray height thereby aiming at completely filling the feeding tray, depending on the material e.g. 20 to 30% can be achieved by selecting smaller adjustment values of the oscillation amplitude. Due to the high layer which will break internally in an undefined manner, in particular also with compressed powders, however, the attained transport consistency of the transport stream on the tear-off edge of the material discharge of the feeding tray is not very good, in particular, in the case of small throughputs.

Thus, a middle position is set as initial parameters, e.g. in a range between 10 and 60% of a maximum transport stream, thereby achieving a good transport consistency and high material throughput at the same time.

According to an embodiment, the characteristic curves are stored with discrete or, respectively, predetermined layer heights of the height adjustment device, thereby increasing reproducibility. The values may also be set e.g. by means of mechanical catches, which is of advantage considering the significant amounts of mass to be adjusted and increases mechanical stability.

The height adjustments are carried out fully automatically by e.g. an electric motor height adjustment device. Thus, the controller device will receive, on the one hand, the values entered by the user and, on the other, during operation the total mass as a function of time for determining the material throughput, and adjust the parameters of the vibration driver and the height adjustment device using suitable control signals. Thus, according to the present disclosure leads to a highly user friendly experience, wherein e.g. the user may enter merely e.g. the type of material, the grain size and the target material throughput as input data, whereupon the controller device determines the relevant characteristic curve and there from the initial parameters and subsequently takes over control.

According to a further embodiment the selection of initial parameters of the vibration feeder, i.e. in particular initial oscillation frequency, initial level height and initial oscillation amplitude, may be carried out under consideration of relative transport rate deviations of the mass throughput. Thus, relative transport rate deviations of the mass throughput depending on, in particular, the material, i.e. material specific, are stored for the corrective value, i.e., in particular, an analog voltage applied to the vibration driver. Thus, advantageously, a small relative transport rate deviation may be selected to attain a constant material throughput.

Thus, the characteristic curves may additionally include the relative transport rate deviations of the mass throughput depending on the corrective value. Thus, the characteristic curves may be stored multi-dimensionally, e.g. three-dimensionally.

Relevant bulk materials are generally all capable of being fluidized, granulated materials, e.g. powder, grains, granulate, flakes, shredded particles, chips or re-granulate. The types of material may be e.g. raw materials for a subsequent treatment process manufacturing process respectively, e.g. plastics such as polymers, or rubber and other materials for a subsequent extrusion process;
further, stone or sand and similar materials, but also e.g. food such as flour and other raw materials may be transported.

Further, the controller device may store the current measurements and settings, i.e. the ratio of material throughput as a function of the set level height and the oscillation amplitude at the oscillation frequency f, in the memory or, respectively, dynamically correct these data so that even changes of the device over longer periods of operation, e.g. by wear, or changes of vibration characteristics that may lead to a change of litter weight, can be taken into consideration. Thus, the process is constantly updated and improved, in principle, without the user having to take any action.

According to the present disclosure, in particular, one or more of the following further developments of the method and/or the device are provided:

A method or a device, where an oscillation frequency is set which is unequal to a resonance frequency of the resonating system consisting of the elastic suspension and the feeder tray loaded with the bulk material, preferably in a range between 10 and 20% below or above the resonance frequency of the resonating system consisting of the elastic suspension and the feeder tray loaded with the bulk material;

a method or a device, where for each characteristic curve, always for one type of material and one particle size, the material throughput is determined depending on the oscillation amplitude and the level height;

a method or a device, where the characteristic curves indicate a relative transport rate deviation depending on a/the corrective variable;

a method or a device, where a characteristic curve with initial parameters for a small or smallest initial oscillation amplitude is selected, for high energy efficiency;

a method or a device, where the level height and the oscillation amplitude at the oscillation frequency are stored as operational parameters;

a method or a device, where a mass discharge that happened during the filling phase by the material discharge is either estimated form the previously determined material throughput or neglected.

The present disclosure relates to a method for vibration feeding of bulk material (2) and a vibration feeder device (1) provided for such purposes, comprising a material feed (5), a charging hopper (4) including a hopper discharge (12), a feeder tray (3), a height adjustment means (18) for adjusting a level height (h) between the hopper discharge (12) and the feeder tray (3), and a vibration driver (6) for driving the feeder tray (3) at an oscillation amplitude and an oscillation frequency, where a target material throughput (MD_soll) and material specific parameters (A, D) of the bulk material (2) are input, initial parameters (h0, W0, f0) for the level height, oscillation amplitude and oscillation frequency are determined from these inputs, and subsequently the level height (h) is adjusted by controlling the height adjustment means (18).

Hereby, a continuous weight measuring as a function of time is carried out as well as a determination of a current material throughput which is then compared to the target material throughput in order to change operating parameter depending on the evaluation, in particular using pre-stored characteristic curves, whereby, preferably, primarily a change of the level height and, as fine adjustment, a change of the oscillation amplitude is provided.

The following numbered clauses include embodiments that are contemplated and non-limiting:

Clause 1. A method for vibration feeding of bulk material (2), including the steps:

providing a vibration feeder device (1) including a material feed (5), a charging hopper (4) with a hopper discharge (12), a feeder tray (3), a height adjustment means (18, 24) for adjusting a level height (h) between the hopper discharge (12) and the feeder tray (3), and a vibration driver (6) for driving the feeder tray (3) at an oscillation amplitude (W) and an oscillation frequency (f) (step ST1), receiving or inputting a target material throughput (MD_soll) and material specific parameters (A, D) of the bulk material (2) (step ST2), determining initial parameters (h0, W0, f0) as operating parameters, the operating parameters (h, W, f) including a level height (h), oscillation amplitude (W) and oscillation frequency (f) (step ST3), setting the level height (h) by controlling the height adjustment means (18, 24) (step ST4), operating the vibration feeder device (1) (step ST5) by
filling the charging hopper (4) in filling phases and
controlling the vibration driver (6) at the oscillation amplitude (W) and oscillation frequency (f), discharging the bulk material (2) at the material discharge (14) of the feeder tray (3), weight measuring a total mass (M) as a function of time (t) and determining a current material throughput (MD) (step ST6), evaluating the determined material throughput (MD) by comparing it to the target material throughput (MD_soll) (step ST7), and depending on the evaluation, changing the operating parameters (h,W,f) (step ST8) and resetting to a point before the step (step ST4) of setting the level height (h).

Clause 2. The method according to clause 1, wherein, as operating parameters, a fixed oscillation frequency (f0) is set, and at the step of changing the operating parameters (h,W,f) (ST8), depending on the evaluation, the oscillation amplitude (W) and/or the level height (h) is changed.

Clause 3. The method according to clause 2, wherein, in evaluating the determined material throughput (MD), a differential value (D) is formed as the amount of the difference of the material throughput (MD) and the target material throughput (MD_soll), the differential value (D) is compared to a difference threshold value (DG), and upon exceeding the difference threshold value (DG) the level height (h) is changed, and the height adjustment device (18, 24) is controlled to change the level height (h), and/or the vibration driver is controlled to change the oscillation amplitude (W).

Clause 4. The method according to clause 3, wherein upon falling below the difference threshold value (DG) the oscillation amplitude (W) is changed, and the vibration driver (6) is controlled to change the oscillation amplitude (W) as fine adjustment.

Clause 5. The method according to one of the above clauses, wherein when determining the initial oscillation amplitude (W0) and the initial level height (ho) as the initial parameters (W0, h0) (step ST3), depending on the input target material throughput (MD_soll) and the input material specific parameters of the bulk material (2), pre-stored material specific characteristic curves (Ki) are read out from a storage means (22) which determine the material throughput (MD) as a function or one or more of the following variables:

a type of material (A), a particle size (G), the oscillation amplitude (W), the level height (h), a relative transport rate deviation (RF), and a characteristic curve (Ki, i=1, 2, . . . ) is selected.

Clause 6. The method according to clause 5, wherein the characteristic curves are stored as discrete characteristic curves (Ki), where for different types of material (A) and grain sizes (G) always one characteristic curve field (FIG. 4) each with several characteristic curves (Ki) is stored, each defining for a certain level height (h) the material throughput (MD) as a function of a corrective variable (s), where the corrective variable (s) indicates the oscillation amplitude (W) and/or the oscillation frequency (f).

Clause 7. The method according to clause 5 or 6, wherein, always depending on a certain characteristic curve criterion (KK), one characteristic curve (Ki) is selected from the plurality of characteristic curves (Ki), the characteristic curve criterion (KK) defining an average value and/or a minimum distance from the end values of the characteristic curve (Ki) and/or a small relative transport rate deviation (RF), so as to generate a wide variance or possibility of changes during the regulating process.

Clause 8. The method according to one of the clauses 5 through 7, wherein one characteristic curve (Ki) with initial parameters (W0, h0, f0) is selected for a small or smallest initial oscillation amplitude (W0), so as to attain high energy efficiency, and/or with a low relative transport rate deviation (RF) as a function of a corrective variable (s), so as to generate a constant material throughput (MD) when regulating the material throughput (MD) by changing the corrective variable (s).

Clause 9. The method according to one of the clauses 5 through 8, wherein the characteristic curves (Ki) in the memory (22) are updated, extended or changed in that the currently determined material throughput (MD) is stored as a function of the operating parameters.

Clause 10. The method according to one of the above clauses, wherein upon weight measuring the total mass (M) (step ST6) an arrangement is weighed, consisting of:

the charging hopper (4) including the bulk material (2) therein contained, the feeder tray (3) including the bulk material (2) therein contained and the vibration driver (6), and the hopper holder (18), as well as the height adjustment device (18, 24), and the current material throughput (MD) is determined as a temporal decrease of the total mass (M) measured.

Clause 11. The method according to one of the above clauses, wherein upon weight measuring the total mass (M) (step ST6) an arrangement is weighed, comprising the charging hopper (4) including the bulk material (2) therein contained, the feeder tray (3) including the bulk material (2) therein contained and the vibration driver (6), and the hopper holder (18), as well as the height adjustment device (18, 24), and the current material throughput (MD) is determined as a temporal decrease of the total mass (M) measured.

Clause 12. The method according to clause 9, wherein the temporal decrease of the total mass (M) measured is determined as discharge of material from the material discharge (14).

Clause 13. The method according to one of the above clauses, wherein the charging hopper (4) is filled only during the filling phases and only in charges by controlling a feed-in means, in particular an output valve (10) in a material feed (5) to the charging hopper (4), where a point in time (t-f) of an initiation of a filling phase is determined depending on the total mass (M) measured, where a mass of bulk material (2) fed-in during a filling phase is determined as the difference of the total mass (M) prior to the point in time (t-f) of the initiation of the filling phase and a total mass (M) after termination of the filling phase.

Clause 14. The method according to one of the above clauses, wherein the bulk material (2) is a material that can be fluidized by vibration, the bulk material (2) being selected: from one or more of the following types of material (A): plastics, gravel, stone, sand, rubber, food such as flour, crop, and/or from one of the following materials capable of being fluidized: granulate, chips, powder, re-granulate, shredded particles, corns, or flakes.

Clause 15. A vibration feeder device (1) for vibration feeding of bulk material (2), comprising:
a charging hopper (4) for receiving bulk material (2) including a bottom hopper discharge (12),
a feeder tray (3) arranged below the charging hopper (4) and comprising a material discharge (14) for putting out the bulk material (2),
the hopper discharge (12) being arranged at a level height (h) above the feeder tray (3),
a vibration driver (6) for riving the feeder tray (3) at an oscillation frequency (f) and an oscillation amplitude (B),
a height adjustment device (18, 24) for adjusting the level height (h),
a scales (7) for measuring a total mass (M),
a controller means (20) which is adapted to receiving a target material throughput (MD_soll) and material specific parameters (A, D), putting out control signals (S2) to the vibration driver (6) for adjusting an oscillation amplitude (W) and oscillation frequency (f), putting out von control signals (S3) to the height adjustment device (24) for adjusting the level height (h), receiving a measured mass value from the scales (7), and determining a material throughput (MD) from the measured mass values depending on time, evaluating the material throughput (MD) by comparing it to a target material throughput (MD_soll), and subsequently putting our control signals (S2, S3) to the vibration driver (6) and/or the height adjustment device (18, 24) depending on the evaluation.

Clause 16. The vibration feeder device (1) according to clause 15, wherein the height adjustment device (18, 24) is provided for adjusting a vertical height of the charging hopper (4) in relation to the feeder tray (3) and/or for adjusting a vertical height of the feeder tray (3) in relation to the charging hopper (4).

Clause 17. The vibration feeder device (1) according to clause 15 or 16, wherein it comprises an elastic suspension (16) of the feeder tray (3) on a vibration driver base (15), allowing vibration in a combined direction from the direction of transport (x) and the vertical direction (z).

Clause 18. The vibration feeder device (1) according to one of the clauses 15 through 17, wherein the scales (7) measure a total mass (M) of an arrangement consisting or at least the height adjustment device (18, 24), the charging hopper (4), the vibration driver (6), the feeder tray (3), the elastic suspension (16), and the vibration driver base (15), including the bulk material (2) contained in the charging hopper (4) and the feeder tray.

The invention claimed is:

1. A method for vibration feeding of bulk material, the method comprising the steps:
providing a vibration feeder device including a material feed, a charging hopper with a hopper discharge, a feeder tray, a height adjustment means for adjusting a level height between the hopper discharge and the feeder tray, and a vibration driver for driving the feeder tray at an oscillation amplitude and an oscillation frequency,
receiving or inputting a target material throughput and material specific parameters of the bulk material,
determining initial parameters as operating parameters, the operating parameters including a level height, oscillation amplitude and oscillation frequency,
setting the level height by controlling the height adjustment means,
operating the vibration feeder device by filling the charging hopper in filling phases and controlling the vibration driver at the oscillation amplitude and oscillation frequency, discharging the bulk material at the material discharge of the feeder tray,
weight measuring a total mass as a function of time and determining a current material throughput,
evaluating the determined material throughput by comparing it to the target material throughput, and
depending on the evaluation, changing the operating parameters and resetting to a point before the step of setting the level height,
wherein, upon weight measuring the total mass, an arrangement is weighed, consisting of: the charging hopper including the bulk material therein contained, the feeder tray including the bulk material therein contained and the vibration driver, and a hopper holder, as well as the height adjustment device, and the current material throughput is determined as a temporal decrease of the total mass measured.

2. The method of claim 1, wherein, as operating parameters, a fixed oscillation frequency is set, and at the step of changing the operating parameters, depending on the evaluation, the oscillation amplitude and/or the level height is changed.

3. The method of claim 2, wherein, in evaluating the determined material throughput, a differential value is formed as the amount of the difference of the material throughput and the target material throughput, the differential value is compared to a difference threshold value, and upon exceeding the difference threshold value the level height is changed, and the height adjustment device is controlled to change the level height, and/or the vibration driver is controlled to change the oscillation amplitude.

4. The method of claim 3, wherein, upon falling below the difference threshold value the oscillation amplitude is changed, and the vibration driver is controlled to change the oscillation amplitude as fine adjustment.

5. The method of claim 1, wherein when determining the oscillation amplitude and the level height as the initial parameters, depending on the target material throughput and the material specific parameters of the bulk material, pre-stored material specific characteristic curves are read out from a storage means which determine the material throughput as a function or one or more of the following variables:
a type of material, a particle size, the oscillation amplitude, the level height, a relative transport rate deviation, and a characteristic curve is selected.

6. The method of claim 5, wherein the characteristic curves are stored as discrete characteristic curves, where for different types of material and grain sizes always one characteristic curve field each with several characteristic curves is stored, each defining for a certain level height the material throughput as a function of a corrective variable, where the corrective variable indicates the oscillation amplitude and/or the oscillation frequency.

7. The method of claim 5, wherein, depending on a certain characteristic curve criterion, one characteristic curve is selected from the plurality of characteristic curves, the characteristic curve criterion defining an average value and/or a minimum distance from the end values of the characteristic curve and/or a small relative transport rate deviation, so as to generate a wide variance or possibility of changes during the regulating process.

8. The method of claim 5, wherein one characteristic curve with initial parameters is selected for a small or smallest initial oscillation amplitude, so as to attain high energy efficiency, and/or with a low relative transport rate deviation as a function of a corrective variable, so as to generate a constant material throughput when regulating the material throughput by changing the corrective variable.

9. The method of claim 5, wherein the characteristic curves in the memory are updated, extended or changed in that the currently determined material throughput is stored as a function of the operating parameters.

10. The method of claim 1, wherein the temporal decrease of the total mass measured is determined as discharge of material from the material discharge.

11. The method of claim 1, wherein the charging hopper is filled only during the filling phases and only in charges by controlling a feed-in means, in particular an output valve in a material feed to the charging hopper, where a point in time of an initiation of a filling phase is determined depending on the total mass measured, where a mass of bulk material fed-in during a filling phase is determined as the difference of the total mass prior to the point in time of the initiation of the filling phase and a total mass after termination of the filling phase.

12. The method of claim 1, wherein the bulk material is a material that can be fluidized by vibration, the bulk material being selected from one or more of the following types of material: plastics, gravel, stone, sand, rubber, food such as flour, crop, and/or from one of the following materials capable of being fluidized: granulate, chips, powder, re-granulate, shredded particles, corns, or flakes.

13. A vibration feeder device for vibration feeding of bulk material, the vibration feeder device comprising
- a charging hopper for receiving bulk material including a bottom hopper discharge,
- a feeder tray arranged below the charging hopper and comprising a material discharge for putting out the bulk material,
- the hopper discharge being arranged at a level height above the feeder tray,
- a vibration driver for riving the feeder tray at an oscillation frequency and an oscillation amplitude,
- a height adjustment device for adjusting the level height,
- a scales for measuring a total mass,
- a controller means which is adapted to receive a target material throughput and material specific parameters, putting out control signals to the vibration driver for adjusting an oscillation amplitude and oscillation frequency, putting out control signals to the height adjustment device for adjusting the level height, receiving a measured mass value from the scales, determining a material throughput from the measured mass values depending on time, evaluating the material throughput by comparing it to a target material throughput, and subsequently putting our control signals to the vibration driver and/or the height adjustment device depending on the evaluation,
- wherein the scales measure a total mass of an arrangement consisting of the height adjustment device, the charging hopper, the vibration driver, the feeder tray, the elastic suspension, and the vibration driver base, including the bulk material contained in the charging hopper and the feeder tray.

14. The vibration feeder device of claim 13, wherein the height adjustment device is provided for adjusting a vertical height of the charging hopper in relation to the feeder tray and/or for adjusting a vertical height of the feeder tray in relation to the charging hopper.

15. The vibration feeder device of claim 13, wherein it comprises an elastic suspension of the feeder tray on a vibration driver base, allowing vibration in a combined direction from the direction of transport and the vertical direction.

* * * * *